2,870,028

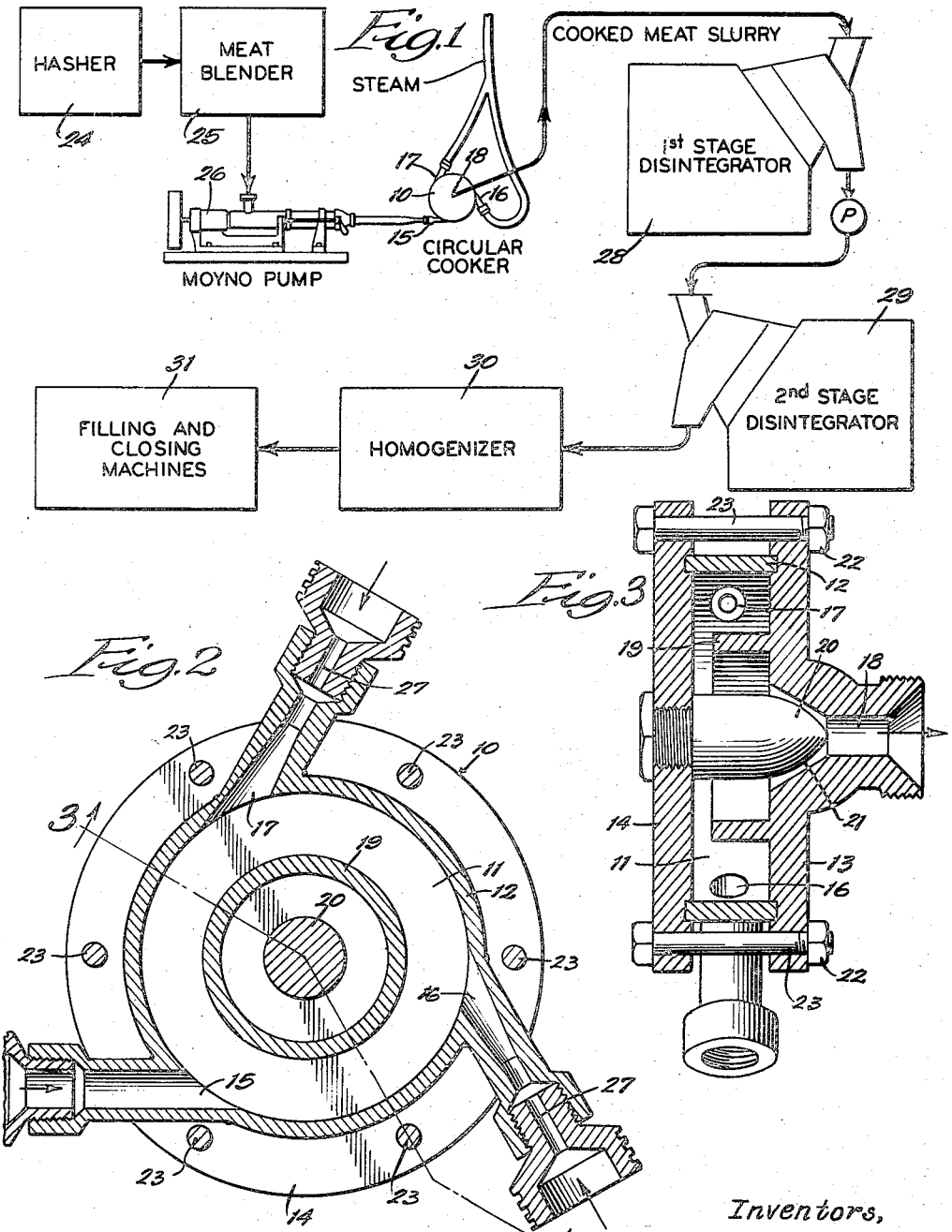

METHOD OF COOKING ANIMAL AND VEGETABLE MATERIALS

Lindson P. Anderson, Chicago, and Kristian Schultz, deceased, late of Chicago, Ill., by Margaret F. Schultz, executrix, Chicago, Ill., assignors to Armour and Company, Chicago, Ill., a corporation of Illinois Application September 14, 1953, Serial No. 379,882

7 Claims. (Cl. 99—216)

This invention relates to a method of cooking animal and vegetable materials, and to a flash cooking apparatus.

The rapid cooking of animal and vegetable materials poses a number of difficult problems which heretofore have not been satisfactorily solved. These problems relate to controlling the cooking of the materials to prevent overcooking and also to prevent the materials from baking or sticking to the apparatus in which they are cooked. In the cooking of baby foods, such as strained meats, vegetables, etc., the usual present practice is to use dry heat in spite of the fact that the rate of cooking could be greatly accelerated by the direct injection of steam into the food materials. When direct steam injection is employed, it has been found that it is very difficult to prevent the materials from being overheated, and when direct steam cooking is used in a continuous process, there is a tendency for the apparatus to clog up. The meat and vegetable particles tend to bake on the heated surfaces in contact with the live steam, and rotating scrapers are required to keep the surfaces free of encrusted materials.

It is therefore a general object of this invention to provide a method and apparatus for the continuous cooking of animal and vegetable materials by the direct injection of steam into the materials which does not require moving parts such as rotating scrapers, while having no tendency to clog up. It is a further object of this invention to provide a method of the character described which is adapted to be carried out in a small-size flash cooking apparatus, while at the same time achieving a very high capacity for the size of the unit. It is another object to provide a flash cooking apparatus of the type described which is adapted to be integrated in a processing line for baby foods, etc. Further objects and advantages will appear as the specification proceeds.

This invention is shown in an illustrative embodiment in the accompanying drawing, in which—

Fig. 1 is a flow sheet showing a flash cooking apparatus constructed in accordance with this invention as it might be integrated in a processing operation for baby foods; Fig. 2, a sectional plan view of the cooking unit of Fig. 1; and Fig. 3, a further sectional view of the same unit taken on line 3—3 of Fig. 2.

In one of its phases, this invention is concerned with a method of treating animal and vegetable materials with steam characterized by the steps of continuously introducing an aqueous slurry of the material to be treated into a raceway having curved walls defining a closed circuit, continuously driving the newly introduced portions of the slurry around the raceway circuit by the substantially tangential introduction of at least one jet of steam into the raceway, while heating the particles of material therein by direct contact with the steam, and continuously removing previously circulated and heated portions of the slurry from the inner portion of the raceway.

While other devices can be employed, it is preferred to carry out the above process in a flash cooking apparatus similar to that shown more clearly in Figs. 2 and 3 of the drawing. The flash cooker designated generally as 10, comprises a casing providing a shallow chamber 11 bounded by a cylindrical wall 12 and end walls 13 and 14. Cylindrical wall 12 has a plurality of tangentially-oriented circumferentially-spaced inlet openings 15, 16 and 17. At least one of the inlet openings should be adapted for the admission of a jet of steam and another for the admission of the material to be cooked, and the inlets should be arranged so that the steam will tend to drive the material to be cooked in an annular or circular path around chamber 11 while cooking the material. In the illustration given, inlet opening 15 is adapted for the admission of the material to be cooked in the form of a slurry, while inlet openings 16 and 17 are adapted for the admission of the jets of steam. Preferably, the inlet openings are substantially tangentially oriented with respect to circular chamber 11.

In the illustration given, end wall 13 is provided with a centrally positioned outlet 18 for the steam-containing slurry formed within chamber 11. Preferably, a baffle means is positioned between inlets 15, 16, and 17, and outlet 18 and is arranged to retard the movement of newly introduced material to the outlet and to direct the circulation thereof in a circular or annular path adjacent cylindrical wall 12. In the embodiment shown, this is accomplished primarily by baffle ring 19 which surrounds outlet 18, being connected to end plate 13 and terminating at a spaced distance from end plate 14. If desired, a further baffle member can be provided within ring 19, such as tapered passage-restricting plug 20 which is adapted to extend into the conical mouth of outlet passage 18 so as to provide a restricted annular exit 21 from chamber 11.

For cleaning purposes, it is desirable to construct cooker 10 so that it can be readily assembled and disassembled. In the embodiment shown, cooker 10 can be disassembled by removing the nuts 22 from clamping bolts 23, and thereby releasing end plates 13 and 14 from the outer ring 12.

Fig. 1 illustrates the manner in which the flash cooker of Figs. 2 and 3 can be integrated to a baby food processing line. For example, meat can be hashed at 24, blended at 25, and passed through a specially constructed pump at 26 into cooker 10 by means of feed inlet 15. Steam is introduced into the circular cooker through openings 16 and 17. Preferably, as illustrated more clearly in Fig. 2, the steam passages leading to inlet openings 16 and 17 are provided with throttling orifices 27 for the purpose of reducing and controlling the steam pressure.

After being circulated and cooked within cooker 10, the meat slurry passes out at 18 and is introduced into a first stage disintegrator at 28, and thereafter into a second stage disintegrator at 29. The particles of meat are reduced to their final small size by passing them through homogenizer 30. The prepared infant meat product is then filled at 31.

In the operation of the method of this invention, an aqueous slurry of the food material is preferably continuously introduced into the outer peripheral portion of an annular raceway, such as the portion of chamber 11 between baffle ring 19 and outer wall 12. The newly introduced portions of the slurry are continuously driven around the raceway by the substantially tangential introduction of steam, for example, by steam inlets 16 and 17. The steam thus introduced drives the slurry around the raceway at a high velocity which causes the slurry to continually scour the inside walls of chamber 11, which has been found to be highly effective in keeping these walls free of material even though the steam is injected at high temperatures. Further, the tumbling of the particles of food material in the slurry causes the steam and solid particles to be intimately mixed so that the steam tends to uniformly condense on the particles. The high velocity of the circulating material is important, as already indicated, in effecting a self-cleaning action by means of which the walls of chamber 11 are kept free of food material, and it also permits the attainment of a very high capacity with a small unit. Some idea of this can be gained from considering the fact that a cooker constructed as illustrated in Figs. 2 and 3 in which chamber 11 has a diameter of about four inches and a thickness of about one inch can be operated at capacities of from 5,000 to 7,000 pounds per hour in the cooking of baby foods.

As illustrated in Fig. 1, it is preferred to employ in conjunction with the flash cooking apparatus described, a progressing cavity pump of the type tending to maintain a constant rate of output at a given pressure setting. This type of pump is usually referred to in the art as a Moyno pump, and this type of pump is illustrated diagrammatically at 26 in Fig. 1. In the operation of a cooker, it has been found important to maintain a constant rate of input of the material to be cooked so that it can be balanced against the input rate of steam from the steam jets, and it is for this reason that the use of a Moyno pump is particularly desirable.

The flash cooker and cooking method described above are susceptible to many specific embodiments. In general, the method and apparatus of this invention is adapted for use in cooking animal and vegetable materials in subdivided condition. For example, this may be desired in processing baby foods, as already indicated, or in other food products where a small particle size is desired, such as potted meats, dog foods, soups, eggs, gravies, etc., or in foods such as chopped ham, hash, fish, etc., which have a larger particle size. It has also been found that the method and apparatus of this invention are suited for use in rendering animal fat from particles of fat-bearing material, or for producing gelatin from particles of collagenous material. The following examples illustrate specific applications.

*Example I*

A strained baby food meat product was prepared from pork liver by grinding the meat and adding salt and water in a food mixer. The slurry thus formed was pumped, using a progressing cavity positive displacement pump, into a flash cooker of the type illustrated in the drawing. The cooked meat was conveyed by pipeline from the cooker directly to a first stage disintegrator and further processed as shown in Fig. 1. In the processing of the pork liver, 33 pounds of water were added per 100 pounds of meat, and 20 pounds of steam was introduced per 100 pounds of meat in the cooker. 13% of the steam condensed and remained in the product, giving a moisture content in the product of 80.7%. It was found that the cooker could readily be operated at a production rate of 2180 pounds per hour and that there was no tendency for the liver material to accumulate on the walls inside the cooker.

*Example II*

Hashed beef, veal, beef hearts, pork liver, and bacon were processed in a manner similar to that described in Example I at temperatures within the cooker up to 230° F. without the cooker becoming clogged or material accumulating on the interior walls thereof. It was further demonstrated that a cooking unit having an interior volume of between 3 and 4 cubic inches could be used to cook meats for baby foods at rates ranging from 1,500 to 6,000 pounds of product per hour.

*Example III*

For the purpose of preparing a beef broth, finely hashed beef chuck was slurried with water in a 2 to 1 ratio. It was then cooked by passing it through a flash cooker of the type illustrated in the drawings. By way of specific example, a slurry of 75 pounds was fed through the cooker at the rate of 12½ pounds per minute at a cooking temperature of 258° F. The cooked meat was then separated in a classifying centrifuge and polished in a Sharples supercentrifuge to remove fines and oil. The particle-free broth was then chilled, filtered, and canned.

In its preferred embodiment, the method of this invention has another important feature. This feature is the beneficial effect which is obtained by the shock rupturing of the cell walls of the material, which is brought about by the sudden release of pressure when the material emerges from the flash cooker. The material which is being cooked contains countless numbers of cells, of course, and these cells each contain a small quantity of water. Since the temperature in the flash cooker is preferably well above 212° F., this water within the cells would become vapor under ordinary conditions. However, it is kept liquid by the fact that there is superatmospheric pressure in the cooker. When the material is ejected from the cooker into the atmosphere, therefore, this water within the cells is explosively converted to the vapor phase, and this causes a rupture of the cell walls. This has a very desirable effect on the texture and body of the material. Moreover, this desirable effect is obtained not only in connection with solid materials, but also with soups and gravies, since in these latter cases the shock rupturing of the cell walls brings about a desirable increased extraction of protein so as to increase the solids content of the liquid. The release of pressure can take place at the point where the material leaves the flash cooker, by having the outlet pipe of a rather substantial diameter, or, if desired, a small diameter pipe can be used in order to preserve the high pressure until the material has traveled through the pipe to some distant point where it can then be discharged into the atmosphere in order to bring about the shock rupturing of the cell walls.

While in the foregoing specification this invention has been described in relation to certain embodiments thereof and many specific details have been set forth for purpose of illustration, it will be apparent to those skilled in the art that the method and apparatus of this invention are susceptible to other embodiments than those set forth, and that many of the specific details described herein can be varied widely without departing from the basic concepts of the invention.

We claim:

1. The method of treating solid animal and vegetable materials with steam, characterized by the steps of continuously pumping an aqueous slurry of the subdivided, solid material to be treated into the outer portion of an annular raceway having curved outer and inner walls defining a closed circuit, continuously driving the newly introduced portions of said slurry around said raceway circuit by the introduction of at least one jet of steam into said raceway while heating the solid particles of material therein by direct contact with the steam, said steam jet without being deflected and without any substantial reduction in its velocity impinging directly upon said newly introduced slurry portions, and continuously removing previously circulated and heated portions of said slurry from the inner portion of the raceway, said outer and inner walls remaining stationary during said method steps.

2. The method of cooking solid animal and vegetable materials in subdivided condition, characterized by the steps of continuously pumping an aqueous slurry containing solid particles of the material requiring cooking into the outer peripheral portion of an annular raceway devoid of moving parts, continuously driving the newly introduced portions of said slurry around said raceway by the substantially tangential introduction of at least one jet of steam into said raceway while cooking the particles of material therein by direct contact with the steam, said steam jet without being deflected and without any substantial reduction in its velocity impinging directly upon said newly introduced slurry portions, and continuously removing previously circulated and cooked portions of said slurry from the inner peripheral portion of said raceway by passing said portions inwardly from said inner peripheral portion to a central discharge outlet.

3. The method of claim 2 in which said slurry is also tangentially introduced and a plurality of jets of steam are employed to drive the slurry around said raceway.

4. In the method of preparing a cooked, disintegrated solid food product, the steps of pumping an aqueous slurry of solid food particles requiring cooking into the outer peripheral portion of an annular raceway having curved inner and outer walls with an open space therebetween, continuously driving the newly introduced portions of said slurry around said raceway by the substantially tangential introduction of at least one jet of steam into said raceway while cooking the food particles therein by direct contact with the steam, said steam jet without being deflected and without any substantial reduction in its velocity impinging directly upon said newly introduced slurry portions, and continuously removing previously circulated and cooked portions of said slurry from the inner peripheral portion of the raceway, said outer and inner walls remaining stationary during said method steps.

5. The method of claim 4 in which said slurry is pumped into said raceway at a controlled rate and pressure to maintain a constant rate of output at a given pressure setting.

6. The method of claim 4 in which said food product is composed essentially of solid meat material.

7. The method of claim 4 in which said food product is composed essentially of solid vegetable material.

References Cited in the file of this patent

UNITED STATES PATENTS

| | | |
|---|---|---|
| 2,077,227 | Bethune | Apr. 13, 1937 |
| 2,086,338 | Sodergreen | July 6, 1937 |
| 2,452,260 | Peebles | Oct. 26, 1948 |
| 2,492,635 | Hawk | Dec. 27, 1949 |
| 2,636,430 | Brown et al. | Apr. 28, 1953 |